Figure 1:
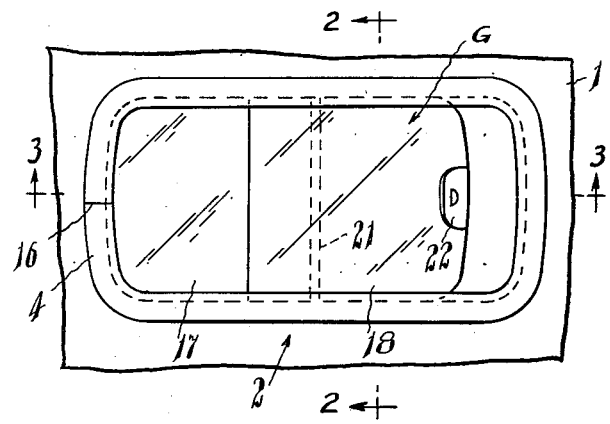

Feb. 1, 1955   I. KLIGER   2,701,162
WINDOW AND MOUNTING
Filed June 17, 1952

INVENTOR:
IRWIN KLIGER
BY Leon Arthurs
his agent

United States Patent Office 2,701,162
Patented Feb. 1, 1955

2,701,162

WINDOW AND MOUNTING

Irwin Kliger, Toronto, Ontario, Canada

Application June 17, 1952, Serial No. 293,930

3 Claims. (Cl. 296—47)

The invention relates to automotive windows particularly of the sliding type used in the rear wall of a truck cab for example; these usually and preferably including at least two panes of glass of which one is slidable over the other to provide an opening for ventilation or communication purposes.

In the past, such windows were usually provided in prefabricated frames which required to be fitted into openings especially cut to receive them. Apart from the high initial cost and numerous other lesser disadvantages attending the prior art, the outstanding objections to the prefabricated windows subsisted in the difficulties and expense attending the installation thereof, and in the critical dimensioning of the openings which had to be cut to receive them; the improper cutting of an opening (which was not at all uncommon) being usually accompanied by exceedingly annoying consequences.

The broad object of the invention is therefore to provide novel means and method for constructing and installing windows of the type herein visualized; the construction and installation being not only cheap and efficient but taking place contemporaneously.

Since the window herein visualized is constructed on the site, as it were, it may be made to fit an opening of any appropriate size and will accommodate itself to any but extraordinary irregularities in the edges of the opening; these being further objects of the invention.

The broad basis for the invention is to be found in the cushion mounting strips whereby stationary windows such as windshields and rear windows are installed in automobiles, for example. The said cushion mounting strip is formed of rubber or other elastic deformable material and is provided with opposed longitudinal grooves or channels; one to receive the edge portion of the automobile body or supporting structure and the other to receive the edge of the glass panel. Heretofore, such strips were employing exclusively on windows comprising but a single glass panel about the perimeter of which the strip was permanently mounted and, once installed, the glass panel could not move relative to the strip or to the supporting structure.

A more specific object of the present invention therefore is to devise a window in which the joint between the glass and the body or supporting frame is effected by this type of mounting strip and in which the glazing consists of two or more panel sections slidable relative to one another in the mounting strip to provide an opening when desired for ventilation or communication purposes.

Along one side of such mounting strips there is normally provided a recess for a wedging member which is insertible therein to crowd the strip material against both the body and the glass panel; the pressure thus caused effectively restraining the glass against movement and forming a water-tight seal.

A further object of the invention therefore is to devise a mounting strip wherein the pressure caused by the wedging member is directed mainly against the body or supporting wall and not against the glazing in order to permit the employment of a readily slidable panel section.

Such mounting strips are usually molded or extruded in long lengths and, to permit one continuous length to fit around the glazing, the corners of the latter are preferably rounded; thus obviously avoiding the need for cutting the material into small pieces and mitering the ends thereof.

It is therefore another object of the invention to provide a mounting strip which is slightly curved longitudinally during its manufacture to lessen the amount of bending or curving required to fit the rounded corners of the windows, but which may be readily straightened or flattened out when applied along the straight edges of the glazing.

As stated above the present window includes a plurality of sections longitudinally slidable relative to one another in a common groove in the mounting strip, and a further object of the invention is to construct the mounting strip so that the bottom of the glass-receiving groove is transversely shaped to cause the glass sections to tightly hug the respective side walls of the strip to maintain a tight joint therewith whether in open or closed position.

Another object is to provide a mounting strip which is adapted to contain a divided glass panel whose sections are slidable relative to one another while maintaining a relatively water-tight seal.

Figure 2:
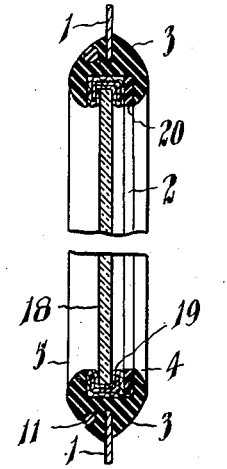
Figure 3:
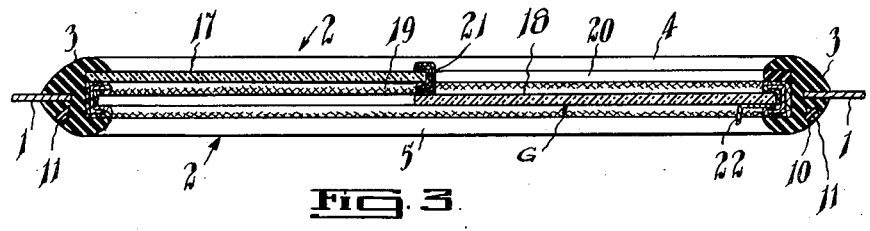
Figure 4:
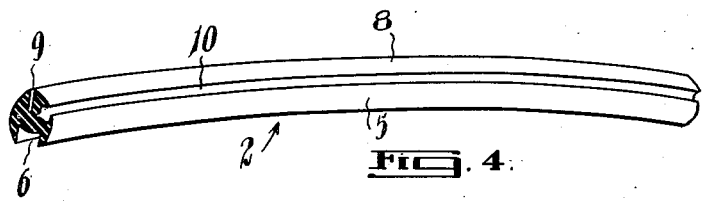
Figure 5:
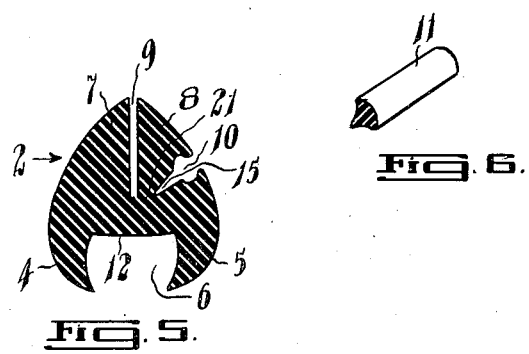
Figure 6:

These and other objects which will hereinafter appear are attained by means of the constructions hereinafter described and illustrated in the accompanying drawings in which:

Fig. 1 is an elevation of part of a wall showing the improved window therein;
Fig. 2 is a vertical section on the line 2—2 in Fig. 1;
Fig. 3 is a horizontal section on the line 3—3 in Fig. 1;
Fig. 4 is a perspective view of a short length of cushion mounting strip;
Fig. 5 is a cross sectional view of the cushion mounting strip; and
Fig. 6 is a perspective view of a short length of wedging member.

In the drawings like numerals of reference indicate corresponding parts in the different figures.

Referring to Fig. 1, the reference numeral 1 indicates a support which may be, for example, the rear wall of a truck cab. This wall is provided with an opening in which a glazing G or other suitable material is to be mounted by means of a cushion mounting strip 2.

This cushion mounting strip 2 which is shown in Fig. 5, is approximately of heart shape in cross section having a wide side and a narrow side and may consist of rubber or other elastic deformable material molded or extruded to the desired shape shown.

The strip 2 is provided at its wide side with a pair of projecting wings 4 and 5 forming between them a wide longitudinal groove or channel 6 to receive the glazing G. At its opposite side, the strip 2 is provided with a pair of projecting wings 7 and 8 forming between them a narrow longitudinal slot or groove 9 to receive the edge 3 of the support or wall surrounding the window opening.

The width of the wide groove 6 is equal to two thicknesses of glass for the purpose of receiving the panel sections in parallel sliding relationship, while the narrow groove 9 is for receiving the edge 3 of the wall 1 which surrounds the window opening and said grooves are arranged in the central longitudinal plane or axis of the strip 2.

The strip 2 is further provided with an undercut longitudinal wedge-receiving recess 10 in its wall between the wings 5 and 8 and in this recess is fitted a filler or spreader strip 11. The position and direction of this recess is very important. In the previous construction, this wedge-receiving recess extended in the general direction of the transverse plane substantially midway between the bottoms of the grooves and the pressure caused by the insertion of the wedging member was directed substantially equally in opposite directions.

In the present construction, the center line or axis of the wedge-receiving recess 10 is directed diagonally at an acute angle to the axis of the narrow groove 9, with its inner end 15 preferably in substantially the transverse plane of the bottom of the said narrow groove, thus providing a comparatively thin hinge connection 21 between the wing 8 and the main portion of the strip 2 which facilitates the swinging of said wing 8.

When the filler or spreader member 11 is placed in position, it crowds the wing 8 against the supporting wall 3, but the pressure towards the wing 5 is to a large extent dissipated by the larger mass of material at that side of the recess 10 and the natural inertia of that wing resulting from the greater thickness of its connection with the main body of the strip 2.

The inner faces of the wings 4 and 5 are curved inwardly towards one another as shown, thus requiring an outward spreading to receive the glazing G between them. The bottom of this groove or channel 6 is crowned or convexed as shown at 12, to thicken the connection between the wings 4 and 5 and the main portion of the strip 2 and thus endow the said wings with greater resistance to the wedging action of the filler or spreader member 11. This crown 12, however, flattens out when the strip 2 is installed and thus provides a flat bed for the glazing G.

As mentioned above, an important feature of the invention is to provide a mounting strip 2 which could more readily be bent around the corners of the transparent panel, and the strip is therefore molded or extruded in such a manner that it has a slight longitudinal curve as illustrated in Fig. 4, which curved shape the strip 2 will naturally assume when it is not otherwise under restraint.

It will be noted that the window opening in the support 1 of Fig. 1 has straight sides with rounded corners, and a single length of mounting strip is used with the joint 16 shown at one end of the opening. The longitudinal natural curving of the strip lessens the amount of forced curving required to bend the strip around the corners, and the straight-running portions of the strip flatten out to receive the glazing G.

The window shown, includes two transparent panel sections 17 and 18. The section 17 is stationary and fits tightly against the outer wing 4. The other section 18 is slidable in a direction parallel to the face of the section 17 and in the groove 6 is positioned a felt-lined U-shaped guide strip 19 in which this section 18 slides. The space in the groove 6 between the guide strip 19 and the wing 4 at the end of the transparent panel section 17 is filled with a packing strip 20 of rubber or other suitable material. The vertical exposed edge of the transparent panel section 17 has a U-shaped strip 21 mounted thereover to seal the space between the panel sections 17 and 18 as shown in Fig. 3.

It will be noted from Fig. 2 that when the wedging member 11 is placed in position, the wing 8 is tightly crowded against the supporting wall 1 to form a tight seal therewith, while the crowding on the other direction is dissipated to a large extent by the larger mass of material at the side of the wing 5 and the resistance thereof to swing, thus permitting the transparent panel section 18 to slide without objectionable friction or binding, but still to maintain a sufficiently tight seal therewith.

It will be apparent from Fig. 2 that the crowned or convexed bottom of the groove 6 helps to hold the transparent panel section 17 and the packing strip 20 to make a tight seal against the entrance of moisture or dirt and also to help retain the guide strip 19 in place.

The movable transparent panel section 18 is provided with a finger grip 22 to facilitate moving it to open or closed position.

What I claim as my invention is:

1. A window structure comprising a cushion connector strip having a narrow outwardly opening groove adapted to embrace the edge of a window opening, and a wide inwardly directed groove; a U-shaped guide strip mounted in said inwardly opening groove, a window comprising a pair of panel sections, one of said sections being mounted in said groove at one end of the opening and at one side of the guide strip, the other of said sections being slidable in the guide strip in a plane parallel to the face of the first mentioned section.

2. A window structure as set forth in claim 1 in which a filler strip is positioned in said inwardly opening groove beyond the end of said other section and paralleling the guide strip.

3. A window structure as set forth in claim 1 in which a filler strip is positioned in said inwardly opening groove beyond the end of said other section and paralleling the guide strip, and a U-shaped packing strip is mounted on the exposed end of said other section.

References Cited in the file of this patent

UNITED STATES PATENTS

| | | |
|---|---|---|
| 1,548,132 | Frisbie | Aug. 4, 1925 |
| 2,138,374 | Edwards | Nov. 29, 1938 |
| 2,189,138 | Eichner | Feb. 6, 1940 |
| 2,255,725 | Trescher | Sept. 9, 1941 |
| 2,572,124 | Eichner | Oct. 23, 1951 |